United States Patent [19]

Biermans

[11] 4,251,235

[45] Feb. 17, 1981

[54] PROCESS FOR THE SEPARATION OF $NH_3$ AND $CO_2$ FROM MIXTURES OF $NH_3$, $CO_2$ AND WATER

[75] Inventor: Andreas J. Biermans, Urmond, Netherlands

[73] Assignee: Stamicarbon, B.V., Geleen, Netherlands

[21] Appl. No.: 30,375

[22] Filed: Apr. 16, 1979

Related U.S. Application Data

[63] Continuation-in-part of Ser. No. 847,654, Nov. 1, 1977, Pat. No. 4,163,648.

[30] Foreign Application Priority Data

Apr. 29, 1978 [NL] Netherlands ..................... 7804668

[51] Int. Cl.$^3$ .................... B01D 53/14; B01D 19/00
[52] U.S. Cl. ........................................ 55/70; 55/48; 55/89
[58] Field of Search ................. 55/48, 68, 70, 89; 423/238

[56] References Cited

U.S. PATENT DOCUMENTS

| | | | |
|---|---|---|---|
| 2,812,829 | 11/1957 | Marullo et al. | 55/70 X |
| 2,992,703 | 7/1961 | Vasan et al. | 55/70 X |
| 3,112,177 | 11/1963 | Fujise et al. | 423/238 X |
| 3,315,442 | 4/1967 | Yuan et al. | 55/70 |
| 3,972,693 | 8/1976 | Wiesner et al. | 55/70 |
| 4,013,431 | 3/1977 | Berkel et al. | 55/70 |
| 4,060,591 | 11/1977 | Garber et al. | 55/70 X |

FOREIGN PATENT DOCUMENTS

| | | | |
|---|---|---|---|
| 916945 | 1/1963 | United Kingdom | 55/70 |
| 1129939 | 10/1968 | United Kingdom | 55/70 |
| 1240499 | 7/1971 | United Kingdom | 55/70 |

*Primary Examiner*—Robert H. Spitzer
*Attorney, Agent, or Firm*—Cushman, Darby & Cushman

[57] ABSTRACT

An improved process for the separate recovery of substantially pure ammonia and substantially pure carbon dioxide from mixtures containing ammonia and carbon dioxide, and possibly water, such as are obtained as by-products in the manufacture of melamine from urea or the synthesis of urea from ammonia and carbon dioxide. The by-product mixture is introduced into a process loop having an ammonia separation zone, a carbon dioxide separation zone and a desorption zone, the zone to which the mixture is initially fed being dependent upon its composition. The separation is effected by maintaining a system pressure differential between the ammonia and carbon dioxide separation zones, or adding diluting water to the carbon dioxide separation zone. The efficiency of the separation is enhanced by introducing an ammonia containing gaseous phase into the bottom of the carbon dioxide separation zone.

14 Claims, 3 Drawing Figures

PROCESS FOR THE SEPARATION OF NH₃ AND CO₂ FROM MIXTURES OF NH₃, CO₂ AND WATER

This application is a continuation-in-part of my co-pending application, Ser. No. 847,654, filed Nov. 1, 1977 now U.S. Pat. No. 4,163,648.

BACKGROUND OF THE INVENTION

The invention relates to an improved process for separating substantially pure ammonia and substantially pure carbon dioxide from mixtures containing ammonia, carbon dioxide and, possibly, water.

In some chemical processes mixtures containing ammonia and carbon dioxide, and sometimes also containing water, are obtained as by-products. For instance, in the synthesis of melamine from urea, a gas mixture is obtained which, in addition to melamine, also contains ammonia and carbon dioxide in amounts of at least 1.7 tons per ton of melamine. Such mixtures are also obtained in the preparation of urea from ammonia and carbon dioxide, resulting from the decomposition of by-product ammonium carbamate, and its separation from the urea product. In order to effectively utilize this ammonia and carbon dioxide after separating it from the melamine or urea, for example as recycle to a urea synthesis process, it is in most cases necessary to raise the gases to a higher pressure. Compression of such mixture requires special measures to prevent the condensation of ammonia and carbon dioxide and the deposition of solid ammonium carbamate thereby formed.

For this reason, such gas mixtures are usually absorbed in water or in an aqueous solution, which results in the formation of an ammonium carbamate solution which can be pumped to the urea synthesis reactor, sometimes being concentrated by desorption and repeated absorption at a higher pressure. A disadvantage of this procedure is that the water, recycled to the urea reactor together with the ammonia and carbon dioxide, has an unfavorable effect on the urea synthesis reaction.

It has been proposed to separately remove the ammonia and carbon dioxide from the by-product mixtures, and to separately recycle them in order to avoid the formation and deposition of ammonium carbamate. However, the binary system of ammonia and carbon dioxide forms a maximum boiling azeotrope at a molar ammonia-to-carbon dioxide ratio of about 2:1, and therefore cannot be separated by simple distillation. This phenomenon also occurs in the ternary system of ammonia, carbon dioxide and water, and the term azeotrope as used herein should be understood to include this phenomenon in the ternary system as well. Also as used herein, with respect to such binary or ternary mixture, the term "rich" with respect to ammonia shall be understood to mean that when heat is applied to a mixture 'rich' in ammonia, substantially pure gaseous ammonia escapes, until the remaining mixture has a composition on the boundary line (to be defined hereinafter). On the other hand the term 'lean' with respect to ammonia means that the mixture is not 'rich' in ammonia.

Conversely the term 'rich' with respect to carbon-dioxide means that when heat is applied to a mixture 'rich' in carbon dioxide, substantially pure carbon dioxide escapes. The term 'lean' with respect to carbon dioxide means, that the mixture is not 'rich' in carbon dioxide.

FIG. 1 shows the ammonia-carbon dioxide-water ternary system at constant pressure in a triangular diagram. The system is divided into two areas by line III which is termed herein the "boundary line", and which represents the azeotropic composition at constant pressure at varying water concentrations. This boundary line cannot be transgressed by means of normal distilling or rectifying techniques.

Thus when a liquid mixture rich with respect to ammonia, that is, falling within the area I on FIG. 1, is rectified, gaseous ammonia escapes until the liquid composition reaches the boundary line. When a mixture rich with respect to carbon dioxide, falling within area II on FIG. 1 is rectified, gaseous carbon dioxide escapes until the liquid composition reaches the boundary line. Once the liquid mixture composition is at the boundary line, further rectification or distillation at constant pressure results in a gaseous mixture of all components, but the composition of the remaining liquid mixture does not leave the boundary line. See also, P. J. C. Kaasenbrood, Chemical Reaction Engineering, Proceedings of the Fourth European Symposium, Sept. 9–11, 1968, published by Pergamon Press (1971), pages 317–328.

Various methods have been proposed to get around this azeotrope, all of which entail the separation of the ammonia-carbon dioxide mixtures into their constituents. Separate recovery of ammonia is most important, it being the most valuable component.

Some of these processes are based on selective absorption of either the ammonia or the carbon dioxide in a liquid. The Netherlands Patent Application No. 143,063, for example, describes a process in which ammonia is absorbed in an aqueous solution of an ammonium salt of a strong acid, such as ammonium nitrate, at an elevated pressure. Selective absorption of carbon dioxide by washing a gas mixture with an aqueous alkanolamine solution, such as monoethanolamine is disclosed in German Pat. No. 669,314. However, all of these processes have the drawback that the absorbed component must thereafter be removed from the absorbent and purified.

It has further been proposed to separate ammonia and carbon dioxide from mixtures of ammonia, carbon dioxide and water by distilling off most of the ammonia in a first step followed by distilling off the carbon dioxide in a second step carried out at a higher system pressure. The term "system pressure" as used herein means the sum of the partial pressures of ammonia, carbon dioxide and water. Processes of this kind are described in U.S. Pat. Nos. 3,112,177 and 4,060,591 and in British Pat. Nos. 916,945 and 1,129,939.

U.S. Pat. No. 3,112,177 describes a process in which in a first step carried out at a system pressure of between 1 and 5 atmospheres absolute, carbon dioxide gas is separated from a mixture of ammonia, carbon dioxide and water, which mixture is lean with respect to ammonia. The remaining liquid is then stripped with, for instance, methane at an overall pressure of 1 atmosphere absolute. This results in a lowering of the system pressure and in the escape of ammonia and some carbon dioxide, so that a mixture of methane, ammonia and carbon dioxide with an overall pressure of 1 atmosphere absolute is obtained. In order to remove traces of carbon dioxide contained in the gas mixture, part of the mixture is condensed, causing the carbon dioxide to be absorbed by the liquid ammonia.

U.S. Pat. No. 4,060,591 discloses a process for recovering ammonia from aqueous mixtures also containing $CO_2$ and $H_2O$ wherein the mixture is first deacidified by stripping out $CO_2$ at an elevated pressure. The remaining liquid is then stripped of all $NH_3$, $CO_2$ and $H_2O$, and the resulting gas mixture is scrubbed or stripped at a reduced pressure, relative to the deacidification step, to yield a gas stream of pure ammonia.

A similar process is described in British Pat. No. 916,945 wherein an ammoniacal liquor is deacidified at an elevated pressure in a column wherein the ascending gas is washed of ammonia by cold water, thereby yielding gaseous carbon dioxide. The remaining liquid is thereafter expanded into a stripper wherein it is freed of all ammonia and carbon dioxide. The resulting gaseous mixture is washed or scrubbed with all or a portion of the ammoniacal liquor feed, before the latter is deacidified, yielding a substantially pure ammonia stream.

In British Pat. No. 1,129,939, a gas mixture consisting of ammonia and carbon dioxide, rich with respect to ammonia, is absorbed in water or an aqueous solution. Ammonia is distilled from the resulting aqueous solution at atmospheric pressure. The remainder of the solution is then subjected to fractional distillation at a pressure of between 5 and 20 atmospheres absolute with heating in order to remove the carbon dioxide.

These latter processes are based on the principle that changing the pressure of a system of ammonia, carbon dioxide and water makes it possible to separate out ammonia at the lower pressure and carbon dioxide at the higher pressure. In these "pressure differential" processes the system pressure in the carbon dioxide separation zone should be at least twice that in the ammonia separation zone. Preferably the ratio between the system pressures in the ammonia separation and the the carbon dioxide separation zones should be between about 1:5 and 1:20, if the separation is to proceed smoothly.

However, the pressure differential processes have the drawback that if the ammonia and carbon dioxide mixture is available at a pressure of more than 1 atmosphere, it first has to be expanded to 1 atmosphere. Gaseous ammonia is then released having a maximum pressure of 1 atmosphere, or even lower in the event a large amount of another gas is present. If this ammonia is to be subjected to further processing, such as in a urea synthesis process, it has to be raised to a higher pressure. The compression energy required for this is quite substantial. Furthermore, the carbon dioxide concentration in the ammonia has to be kept extremely low in order to avoid the formation and deposition of solid ammonium carbamate in the compressor and high pressure lines.

An alternate process not requiring this pressure differential is disclosed and claimed in my co-pending application Ser. No. 847,654, filed Nov. 1, 1977 now U.S. Pat. No. 4,163,648, the entire disclosure of which is hereby incorporated by reference herein. The process therein described permits the recovery of ammonia and carbon dioxide separately from such mixtures, without the need for such a pressure differential, if the ammonia and carbon dioxide containing feed supplied to a carbon dioxide separation zone is diluted by the addition of water in an amount of between 0.2 and 6 times, by weight, the total weight of such ammonia and carbon dioxide containing feed. For simplicity this latter process will be referred to herein as a "dilution process."

According to one embodiment of the dilution process, ammonia substantially free of carbon dioxide and water is first separated from a mixture of ammonia, carbon dioxide and possibly water, rich with respect to ammonia, in an ammonia separation zone. From the residual liquid phase leaving the bottom of this ammonia separation zone, carbon dioxide is separated in the carbon dioxide separation zone, wherein the residual liquid phase from the ammonia separation zone fed to the carbon dioxide separation zone is diluted with between 0.2 and 6 times its weight of water.

According to another embodiment of the dilution process, carbon dioxide substantially free of ammonia and water is first separated in a carbon dioxide separation zone from a mixture of ammonia, carbon dioxide and possibly water, which mixture is lean with respect to ammonia. From the bottom of this carbon dioxide separation zone, the residual liquid phase is fed to a desorption zone wherein virtually all ammonia and carbon dioxide are desorbed and the resulting gas phase is introduced into the ammonia separation zone. Ammonia, substantially free of carbon dioxide and water, is recovered from this resulting gas phase in the ammonia separation zone, and the resulting liquid phase is supplied to the carbon dioxide separation zone. Diluting water is added to this carbon dioxide separation zone in an amount of between 0.2 and 6 times, by weight, the combined total weight of the initial mixture to be separated, plus the residual liquid phase from the ammonia separation zone fed into the carbon dioxide separation zone.

According to another embodiment of the dilution process, where the ammonia and carbon dioxide containing mixture to be separated also contains a substantial quantity of water, it may be advantageous to feed this mixture initially to the desorption zone wherein the ammonia and carbon dioxide are desorbed, and, together with some water vapor, are introduced into the ammonia separation zone. Ammonia, substantially free of carbon dioxide and water vapor, is obtained from the top of the ammonia separation zone, and the residual liquid phase, containing ammonia, carbon dioxide and water, is introduced into the carbon dioxide separation zone. Diluting water is also introduced into the carbon dioxide separation zone in an amount of between about 0.2 to 6 times, by weight, the total quantity of the residual liquid phase from the ammonia separation zone fed into the carbon dioxide separation zone. Carbon dioxide, substantially free of ammonia and water, is obtained from the top of the carbon dioxide separation zone, and the residual liquid phase from the bottom of the carbon dioxide separation zone is fed to the desorption zone.

SUMMARY OF THE INVENTION

In both the pressure differential and dilution processes, the composition of the residual liquid phase from the carbon dioxide separation zone should reach or closely approximate the boundary line, or azeotropic composition under the prevailing conditions, in order to maximize the efficiency of the separation. However in practice such a composition is very difficult to achieve. Rather this composition remains rich with respect to carbon dioxide (in area II on FIG. 1), some distance from the boundary line. Unless the carbon dioxide content of the residual liquid can be brought to within 1% by weight of the boundary line composition, excessive energy is consumed by the separation, and the recycle flows throughout the entire separation are significantly larger than would otherwise be required. Often, however, it has been found that the distance of this residual liquid composition from the boundary line is greater, for instance between 1.5 and 2% by weight.

The term "distance from the boundary line" as used herein denotes the difference between the carbon dioxide content of the residual liquid, and the carbon dioxide content of the corresponding point on the boundary line, both expressed as percent by weight. Thus on FIG. 1, the composition of this residual liquid would be represented by a point in area II, relatively close to the boundary line. The corresponding point on the boundary line would be the point of intersection of the boundary line and a straight line drawn from the $CO_2$ vertex through the point representing the residual liquid composition in area II.

Inasmuch as even a slight increase in the carbon dioxide content in the residual liquid from the carbon dioxide separation zone can result in a significant increase in energy requirements to maintain the same separation, attempts have been made at keeping the carbon dioxide concentration as low as possible. However, it has been found that maintaining a constant carbon dioxide concentration is very difficult, because the separation is very sensitive to even slight variations in process conditions that normally occur. These variations most generally result in an increase in the carbon dioxide content of this residual liquid, and thus an undesirable increase in energy consumption.

It has now surprisingly been found that the above mentioned difficulties can be avoided if the composition of the residual liquid phase removed from the bottom of the carbon dioxide separation zone is caused to be lean with respect to carbon dioxide rather than rich as in the above noted processes. In other words, with reference to FIG. 1, the composition of this residual liquid phase is caused to be on, or on the ammonia side (area I) of boundary line III. This is achieved, according to the present invention, by feeding an ammonia containing gaseous phase into the bottom of the carbon dioxide separation zone, typically a rectification column, in the portion from which the residual liquid phase is removed.

The ammonia containing gaseous phase may be pure ammonia, or any mixture containing ammonia that is capable of raising the ammonia to carbon dioxide ratio in the liquid phase removed from the carbon dioxide separation zone. This gaseous phase may even be a mixture of ammonia and carbon dioxide, provided its $NH_3/CO_2$ molar ratio is higher than that of the gas phase in equilibrium with this residual liquid phase.

Part of the off-gas removed from the desorption zone can advantageously be fed into the bottom of the carbon dioxide separation zone, with the remainder being supplied to the ammonia separation zone. Preferably about 1 to 50% by weight, most preferably about 5 to 40% by weight, of this desorption zone off-gas is diverted to the bottom of the carbon dioxide separation zone.

The quantity of such ammonia containing gaseous phase fed into the bottom of the carbon dioxide separation zone should be sufficient to move the carbon dioxide content of the residual liquid phase removed therefrom at least to the corresponding point on the boundary line, but preferably to a distance of not more than 2% by weight past the boundary line into the ammonia rich side of this line. Of course the gross composition of the total mass flow into the carbon dioxide separation zone must be on the side of the boundary line rich with respect to carbon dioxide. Otherwise, no carbon dioxide can be separated off.

When using the process of this invention in conjunction with the dilution process described above, particularly low energy consumptions can be realized, and the separation becomes virtually insensitive to fluctuations in the composition of the feed(s) to the carbon dioxide separation zone. Furthermore, the volume of liquid flows required to be circulated through the various separation zones can be significantly reduced.

Preferably the pressures in the various separation zones should be between about 50 and 5000 kPa. A pressure of about 1800 kPa or more, depending upon the temperature of the cooling water available, as referred to hereinafter, in the ammonia separation zone offers the advantage that the separated ammonia can be liquified relatively easily and inexpensively by cooling with cooling water. In the dilution type process, the system pressure in the carbon dioxide separation zone can be the same as in the ammonia separation zone, but can be higher as well. Preferably, however, the system pressure in the carbon dioxide separation zone will not be greater than twice the system pressure in the ammonia separation zone.

The temperatures maintained in the various separation zones depend on the pressures, the composition of the feed and the purity required of the products to be separated. In the dilution process, these temperatures, where rectifying columns are used in the separation zones, generally range within the limits stated in the following table:

|  | bottom | top |
| --- | --- | --- |
| $NH_3$-separation | +60 to +170° C. | −35 to +66° C. |
| $CO_2$-separation | +75 to +200° C. | 0 to +100° C. |

The temperatures in the desorption zone are also determined by the pressures, the composition of the feed to the zone and the purity requirements (amount of ammonia and carbon dioxide) for the desorption water removed from the bottom of this zone. Generally these temperatures are chosen to be higher than the boiling point of the liquid phase to be desorbed at the pressures used.

When using the process of this invention in conjunction with a pressure differential type of process, the system pressure in the carbon dioxide separation zone should be at least twice the system pressure in the ammonia separation zone. However, for the separation to proceed smoothly it is preferable that the ratio of the system pressure in the carbon dioxide separation zone to the system pressure in the ammonia separation zone be within the range of between about 1:5 and 1:20. The temperatures maintained in the various separation zones again depend upon the pressure chosen, the composition of the feed and the purity required of the products to be separated.

It may also be of some advantage, when using a pressure differential type of process, to feed some diluting water into the carbon dioxide separation zone to assist in the separation. In such case the amount of diluting water added depends upon many factors including the pressure differential used between the carbon dioxide and ammonia separation zones, and the composition of the various feeds.

The choice to which separation step the mixture to be separated is initially fed depends i.a. upon the composition of this mixture. Thus, if it is rich with respect to ammonia, (in area I on FIG. 1), then it is most advantageously fed to the ammonia separation step. On the other hand, if it is lean with respect to ammonia, (on boundary line III or within area II on FIG. 1), then it is most advantageously fed initially to the carbon dioxide separation step. Finally, if the mixture to be separated is rich with respect to ammonia and also contains a substantial quantity of water, it may be most advantageous to feed it initially to the desorption step.

The ammonia and carbon dioxide zones may consist of any type of apparatus suitable for separating the gaseous and liquid components in accordance with the invention including, but not limited to, rectification, distillation and washing columns. However, rectification columns, or columns having rectification zones, are most suitable for use in the improved process of this invention.

Some variations may be made in the flows between the various separation zones of the separation process to which the present process is applied, and still be within the scope and intent of this invention.

DETAILED DESCRIPTION OF THE PREFERRED EMBODIMENTS

Figure 1:
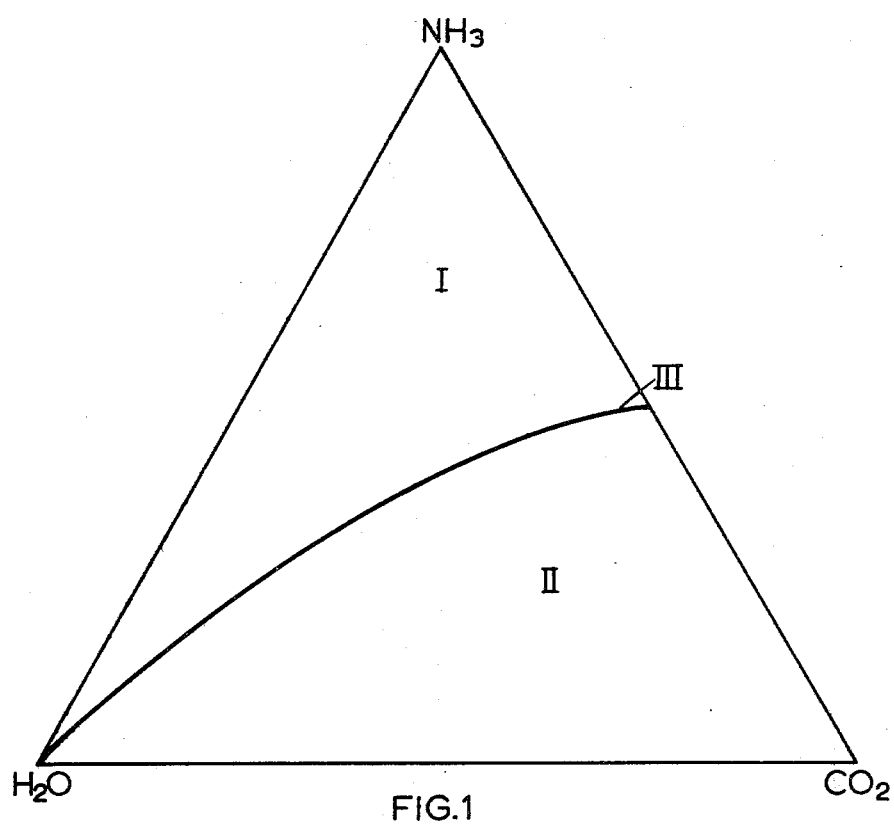
FIG. 1 shows a diagram of the $NH_3/CO_2/H_2O$ system at constant pressure, which was described in detail above.
Figure 2:
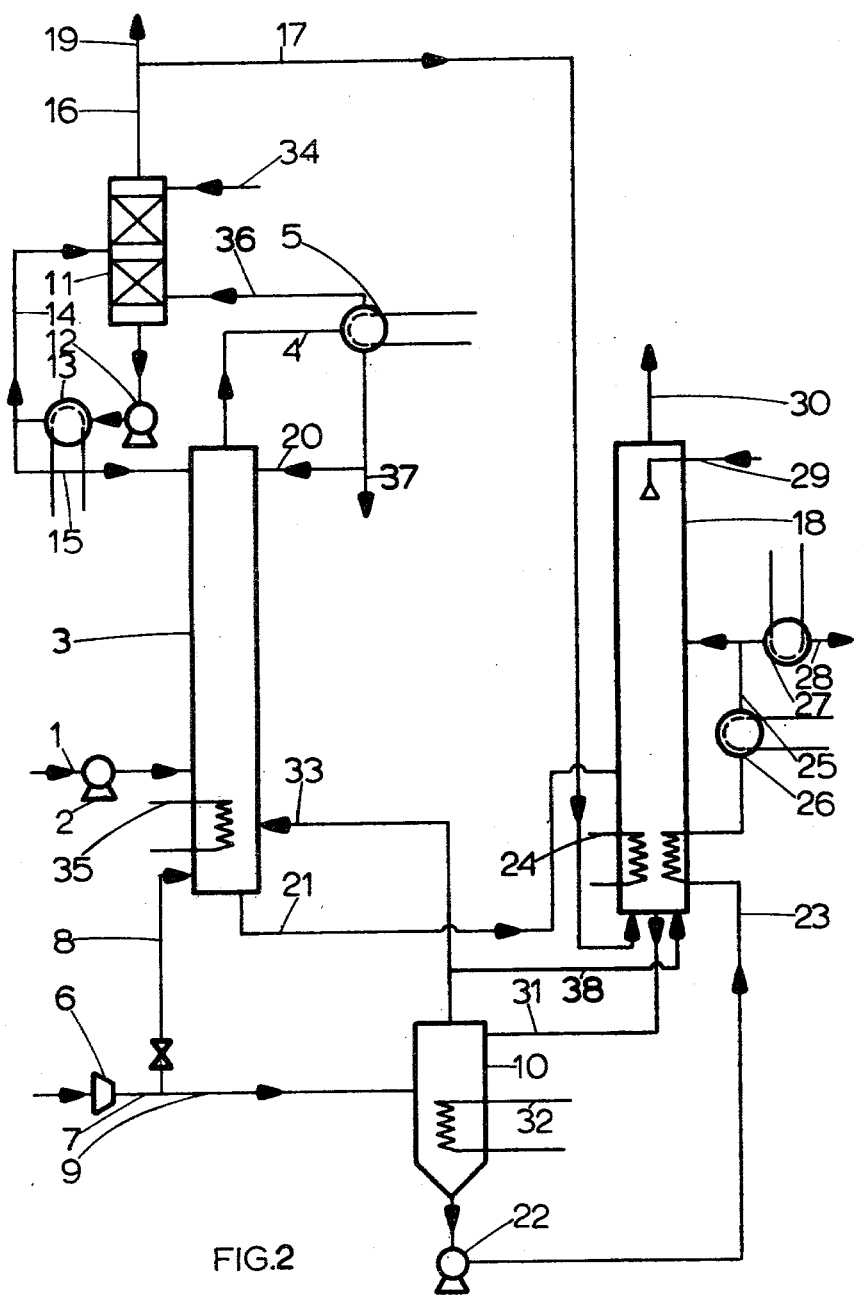
FIG. 2 shows a diagram for the process according to the invention used in conjunction with a dilution process in which the $NH_3$ and the $CO_2$ separation zones are operated at almost the same pressure.

One preferred embodiment of this invention is illustrated in FIG. 2 wherein the ammonia addition is applied to a dilution process in which the ammonia and carbon dioxide separation zones are operated at substantially the same pressure. In this FIG. 2, the ammonia separation zone is comprised of $NH_3$-rectifying column 3, the carbon dioxide separation zone of $CO_2$-rectifying column 18 and the desorption zone of desorber 10.

A mixture of $NH_3$, $CO_2$ and $H_2O$ is fed to an $NH_3$-rectifying column 3 through conduit 1 and pump 2. If necessary, heat can be supplied to this column 3 through heating coils 35. $NH_3$ is discharged from the top of column 3 through conduit 4. This $NH_3$ can be condensed by (deep-) cooling in condenser 5. A noncondensed gaseous mixture of $NH_3$ and inert gas escapes from the condenser through line 36, into scrubber 11. This inert gas comes from the air introduced into the installation to passivate the structural materials used in vessels and conduits in order to reduce corrosion to an acceptable level. Naturally, oxygen or an oxygen-releasing substance may be used for this purpose instead of air. Part of the air is fed to the $NH_3$-rectifying column 3 through compressor 6 and conduits 7 and 8 and part to desorber 10 through conduit 9. The gaseous mixture from condenser 5 is freed of $NH_3$ in scrubber 11 by washing it with water supplied through conduit 34, while an amount of absorption heat is removed by cooling part of the resulting aqueous $NH_3$ solution that is discharged through pump 12 in a recycle cooler 13 and returning it to scrubber 11 through conduit 14. The solution then formed is returned to $NH_3$-rectifying column 3 through conduit 15.

The inert gas is discharged through conduit 16 and fed to the bottom of $CO_2$-rectifying column 18 through conduit 17. If so desired, it may also be vented completely or partly through conduit 19. Part of the $NH_3$ liquified in condenser 5 flows back through conduit 20 to the $NH_3$-rectifying column to be used as reflux. A solution of $NH_3$ and $CO_2$ in water is discharged from the bottom of the $NH_3$-rectifying column 3 through conduit 21.

This solution is passed into the $CO_2$-rectifying column 18, which is operated at virtually the same pressure as the $NH_3$-rectifying column 3. Part of the bottom product of desorber 10 is fed to column 18 as a diluant by way of pump 22 and conduit 23. In order to obtain a better heat distribution, this desorption water is first allowed to give off part of its heat in the bottom of the $CO_2$-rectifying column 18. The remainder of the heat required for the rectification is supplied here by means of heating coils 24 and, for instance, steam. Part of the liquid flow from conduit 23 is discharged through conduit 25 after being cooled in condensers 26 and 27 and through conduit 28. An additional amount of washing water is fed to column 18 through conduit 29 to remove the $NH_3$ as completely as possible from the $CO_2$. A gas consisting of $CO_2$ and inert gas, if any, essentially free of $NH_3$, escapes from the top of column 18 through conduit 30. The bottom product, or residual liquid phase, of column 18, which is a diluted solution of $NH_3$ and $CO_2$ in water, is passed through conduit 31 to desorber 10. Virtually all $NH_3$ and $CO_2$ are removed in desorber 10 by heating, for instance with steam in heating coils 32. The resulting desorption water is virtually free of $NH_3$ and $CO_2$ and flows through conduit 23 to $CO_2$-rectifying column 18. The gaseous mixture of $NH_3$, $CO_2$ and $H_2O$ formed in desorber 10 flows partly to $NH_3$-rectifying column 3 through conduit 33 and partly to the bottom of the $CO_2$-rectifying column through conduit 38. In the above embodiment of the process according to the invention, this desorption zone off-gas mixture of $NH_3$, $CO_2$ and $H_2O$, having a composition lying in the area rich in $NH_3$, serves to make the aqueous liquid phase in the bottom of the $CO_2$-rectifying column rich with respect to $NH_3$.

Figure 3:
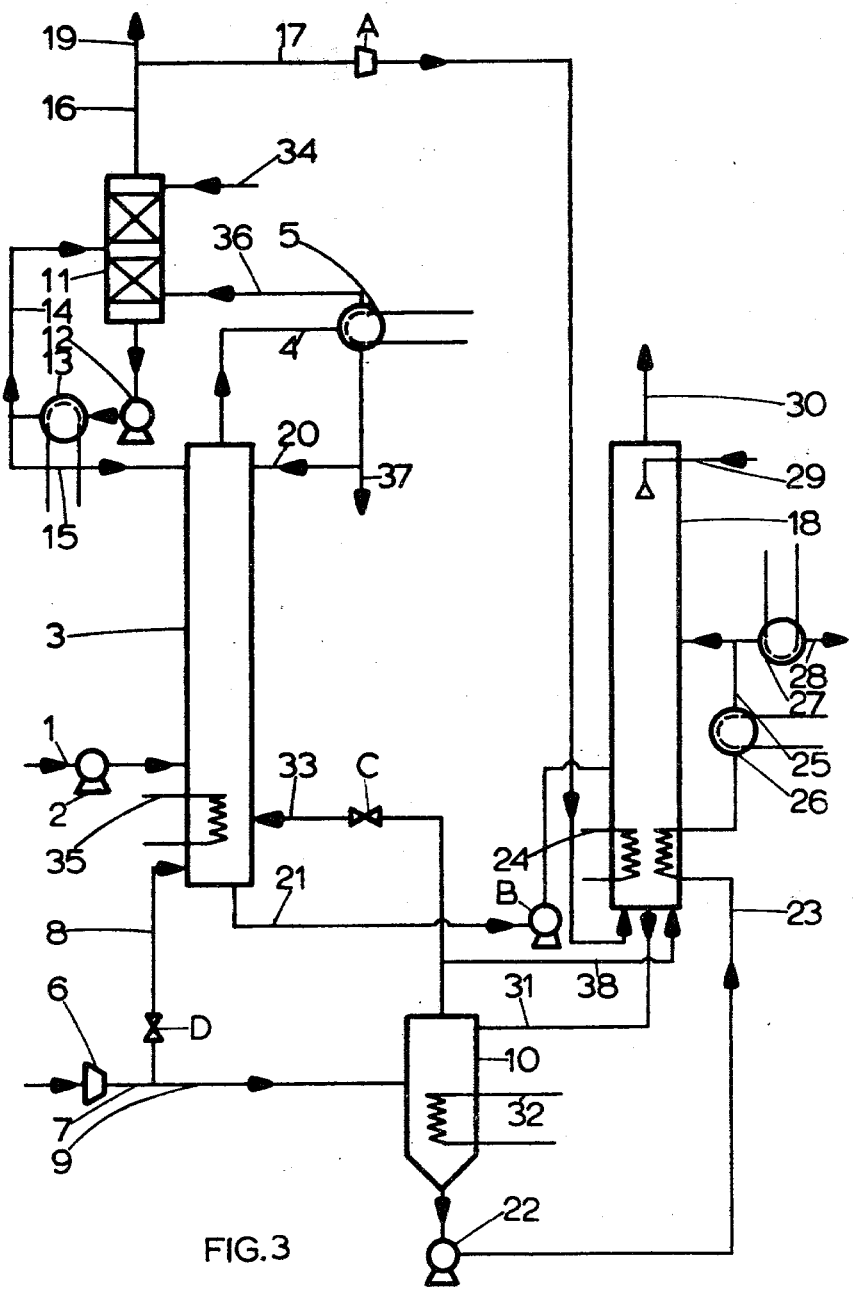
FIG. 3 shows a diagram of a similar process in which the separations are effected at different pressures.

Another preferred embodiment of the invention utilizing the dilution process is illustrated in FIG. 3 wherein the $CO_2$ rectification is effected at a pressure higher than the $NH_3$ rectification.

This figure is virtually the same as FIG. 2, and the reference figures have the same meaning. The differences lie in the fact that a compressor A and a pump B, respectively, are installed in conduits 17 and 21 to raise the pressure of the flows of gas of liquid, respectively. Furthermore, conduit 33 comprises a reducing valve C through which part of the gaseous mixture from desorber 10 is reduced in pressure. Here the desorption column 10 is operated at virtually the same system pressure as the $CO_2$ rectification. Conduit 18 moreover comprises a reducing valve D which is used to lower the pressure of part of the air fed in.

A third embodiment of the invention utilizing the pressure differential process can also be effected in the apparatus illustrated in FIG. 3. In such case the pressure at which the $CO_2$-separation is effected is at least 2 times, but preferably 5 times as high as the pressure at which the $NH_3$ separation is effected. In this case no diluant need to be added to the $CO_2$-separation zone as is the case in the dilution type process.

The invention will be further described by means of the following examples, which are for illustrative purposes only, and the scope of the invention is not restricted thereto.

EXAMPLE 1

Substantially pure $NH_3$ and substantially pure $CO_2$ were separated from a mixture of $NH_3$, $CO_2$ and $H_2O$ in an installation having a configuration as shown in FIG. 3, using the dilution type process.

The reference figures relate to FIG. 3 as described above in relation to FIG. 2 and percentages are percentages by weight. The pressures mentioned relate to the $NH_3/CO_2/H_2O$ system pressure. The actual pressure may be slightly higher owing to the presence of inert gas.

At a pressure of 1800 kPa and a temperature of 66° C., 44348 kg/h of a solution of $NH_3$ and $CO_2$ in water, the composition of which is 38.3% $NH_3$, 21.1% $CO_2$ and 40.6% water, are added to the $NH_3$-rectifying column 3. 635 kg/h of air are added by way of compressor 6, 248 kg/h being introduced into the $NH_3$-rectifying column 3 and 387 kg/h into desorber 10.

25,270 kg/h of a gaseous mixture consisting of 55.4% $NH_3$, 9.6% $CO_2$, 33.5% $H_2O$ and 1.5% of inert gas from desorber 10, having a temperature of 184.7° C., are expanded to 1800 kPa through valve C and then also fed into the $NH_3$-rectifying column 3. 37,246 kg/h of gaseous mixture consisting of 98.0% $NH_3$, 0.3% $H_2O$ and 1.7% inert gas are discharged from the top of this column. Part of this gaseous mixture is liquified by cooling in condenser 5. 17,824 kg/h of this mixture are returned to column 3 as a reflux. 16,959 kg/h of liquid $NH_3$ are discharged. 2,464 kg/h of gaseous mixture consisting of 74.2% $NH_3$ and 25.8% inert gas escape from condenser 5. This mixture is washed in scrubber 11 with 2000 kg/h of water. Heat is removed from scrubber 11 via recycle condenser 13. Per hour, 3829 kg of a solution consisting of 47.8% $NH_3$ and 52.2% $H_2O$ are returned to the $NH_3$-rectifying column. The temperature in the top of this column amounts to 53° C.

635 kg/h of inert gas are passed through conduits 16 and 17 and compressor A to the $CO_2$-rectifying column 18, which is operated at a system pressure of 3000 kPa. 54,273 kg/h of a liquid with a temperature of 131° C. and a composition of 25.8% $NH_3$, 21.8% $CO_2$ and 52.4% $H_2O$ are passed from the bottom of the $NH_3$-rectifying column 3 through conduit 21 and pump B to the $CO_2$-rectifying column 18.

This column 18, in which the pressure is 3000 kPa, is fed with 7200 kg/h of a gas mixture from desorber 10 through conduit 38. This amount is 22.4% of the total amount of gas mixture leaving desorber 10. Column 18 is also fed, through conduit 25, with 46,313 kg/h of a diluant consisting of water and traces of $NH_3$ and $CO_2$, which has a temperature of 231° C. when leaving the desorber. Part of this heat is released in the bottom of the $CO_2$-rectifying column 18. In all 72,227 kg/h of liquid are discharged from the desorber, so that 25,914 kg/h of water, after cooling in condenser 27, are discharged from the system, and this desorption water may be used, for instance, for the absorption of $NH_3$ and $CO_2$.

5,951 kg/h of washing water are fed to the top of the $CO_2$-rectifying column in order to wash out the last traces of $NH_3$. The bottom temperature of the $CO_2$-rectifying column 18 is kept at a temperature of 180° C. by means of steam. The temperature at the top is 55° C. A gaseous mixture of 10,061 kg/h escapes from the top and contains, inter alia, 93.2% $CO_2$ and contains less than 100 ppm $NH_3$. 104,311 kg/h of a solution having a temperature of 180° C. and consisting of 79.9% $H_2O$, 17.3% $NH_3$ and 3.0% $CO_2$ are passed from the bottom of the column 18 to desorber 10. The composition of this liquid is on the side of the boundary line that is rich in $NH_3$. In this desorber the solution is virtually freed of $NH_3$ and $CO_2$ by means of steam, so that 72,227 kg/h of water, with only traces of $NH_3$ and $CO_2$, can be discharged. At the top of the desorber the temperature is 185° C.

EXAMPLE 2

In the process described in Example 1, the ratio between the amounts of gas mixture from the desorber that were returned to the $NH_3$ and the $CO_2$ separating zones, respectively, were varied. In this manner, residual liquid phases were obtained in the bottom of the $CO_2$-separating zone having compositions lying on the side of the boundary rich in $CO_2$, on the boundary line, and on the side of the boundary rich in $NH_3$, respectively. The table shows the relative energy consumptions depending upon the position of the composition of the residual liquid phase removed from the $CO_2$-separating zone relative to the boundary line. In all cases the same results with regard to the quantity and purity of the various components obtained were aimed at. In each experiment the energy consumption is put at 100% when no gas containing $NH_3$ is passed to the $CO_2$-separating zone.

TABLE

| Distance from boundary line | −1 | 0 | +1 |
|---|---|---|---|
| Experiment | \multicolumn{3}{c}{relative energy consumption} | | |
| 1 | 89% | 89% | 100% |
| 2 | 85% | — | 100% |
| 3 | 92% | — | 100% |

With respect to the "distance from the boundary line" on the above table, "−1" means 1% by weight of $CO_2$ on the side of the boundary line rich with respect to ammonia; "0" means a residual liquid phase having a composition on the boundary line; and "+1" means 1% by weight $CO_2$ on the side of the boundary rich with respect to $CO_2$, which resulted from no ammonia containing gaseous phase being passed into the bottom of the ammonia separation column.

What is claimed is:

1. In a process for the separate recovery of ammonia substantially free of carbon dioxide and water, and carbon dioxide substantially free of ammonia and water, from a mixture essentially containing ammonia and carbon dioxide, said process comprising the steps of:

separating an ammonia off-gas substantially free of carbon dioxide and water by rectification in an ammonia separation zone, and removing the resulting residual liquid phase containing ammonia, carbon dioxide and water therefrom and introducing it into a carbon dioxide separation zone;

separating a carbon dioxide off-gas substantially free of ammonia and water by rectification in a carbon dioxide separation zone and removing the resulting residual liquid phase containing ammonia, carbon dioxide and water therefrom and introducing it into a desorption zone; and separating an off-gas containing ammonia, carbon dioxide and water vapor from a liquid phase of desorption water substantially free of ammonia and carbon dioxide, and introducing at least a portion of said off-gas into said ammonia separation zone; the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

2. In a process for the separate recovery of ammonia substantially free of carbon dioxide and water, and carbon dioxide substantially free of ammonia and water, from a mixture essentially containing ammonia and carbon dioxide, which mixture is rich with respect to ammonia, said process comprising the steps of:

introducing said mixture into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide; and introducing at least a portion of said desorption zone off-gas into said ammonia separation zone;

wherein diluting water is introduced into said carbon dioxide separation zone in an amount of between about 0.2 and 6 times, by weight, the total weight of said residual liquid phase from said ammonia separation zone introduced into said carbon dioxide separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

3. In a process for the separate recovery of ammonia substantially free of carbon dioxide and water, and carbon dioxide substantially free of ammonia and water, from a mixture essentially containing ammonia and carbon dioxide, which mixture is lean with respect to ammonia, said process comprising the steps of:

introducing said mixture into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide;

introducing at least a portion of said desorption zone off-gas into an ammonia separation zone and separately removing therefrom an ammonia off-gas substantially free of carbon dioxide and water, and a residual liquid phase containing ammonia, carbon dioxide and water; and introducing said residual liquid phase from said ammonia separation zone into said carbon dioxide separation zone;

wherein diluting water is introduced into said carbon dioxide separation zone in an amount of between about 0.2 and 6 times, by weight, the combined total weight of said mixture and said residual liquid phase from said mixture and said residual liquid phase from said ammonia separation zone introduced into said carbon dioxide separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

4. In a process for the separate recovery of ammonia substantially free of carbon dioxide and water, and carbon dioxide substantially free of ammonia and water, from a mixture essentially containing ammonia and carbon dioxide, which mixture is rich with respect to ammonia and additionally contains a substantial amount of water, said process comprising the steps of:

introducing said mixture into a desorption zone and separately removing therefrom a desorption zone off-gas containing ammonia, carbon dioxide and water vapor, and a liquid phase of desorption water substantially free of ammonia and carbon dioxide;

introducing at least a portion of said desorption zone off-gas into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water and a residual liquid phase containing ammonia, carbon dioxide and water; and introducing said residual liquid phase from said carbon dioxide separation zone into said desorption zone;

wherein diluting water is introduced into said carbon dioxide separation zone in an amount of between about 0.2 and 6 times, by weight, the total weight of said residual liquid phase from said ammonia separation zone introduced into said carbon dioxide separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

5. The process of claims 2, 3 or 4 wherein the system pressure in said carbon dioxide separation zone is no greater than twice the system pressure in said ammonia separation zone.

6. The process of claim 5 wherein the system pressure in said carbon dioxide separation zone is substantially the same as the system pressure in said ammonia separation zone.

7. In an process for the separate recovery of ammonia substantially free of carbon dioxide and water, and carbon dioxide substantially free of ammonia and water, from a mixture essentially containing ammonia and carbon dioxide, which mixture is rich with respect to ammonia, said process comprising the steps of:

introducing said mixture into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide; and introducing at least a portion of said desorption zone off-gas into said ammonia separation zone;

wherein the system pressure in said carbon dioxide separation zone is greater than twice the system pressure in said ammonia separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

8. In a process for the separate recovery of ammonia substantially free of carbon dioxide and water, and carbon dioxide substantially free of ammonia and water, from a mixture essentially containing ammonia and carbon dioxide, which mixture is lean with respect to ammonia, said process comprising the steps of:

introducing said mixture into a carbon dioxide separation zone and separately removing therefrom a carbon dioxide off-gas substantially free of ammonia and water, and a residual liquid phase containing ammonia, carbon dioxide and water;

introducing said residual liquid phase from said carbon dioxide separation zone into a desorption zone and separately removing therefrom a desorption zone off-gas containing ammonia, carbon dioxide and water vapor, and a liquid phase of desorption water substantially free of ammonia and carbon dioxide;

introducing at least a portion of said desorption zone off-gas into an ammonia separation zone and separately removing therefrom an ammonia off-gas substantially free of carbon dioxide and water, and a residual liquid phase containing ammonia, carbon dioxide and water; and introducing said residual liquid phase from said ammonia separation zone into said carbon dioxide separation zone;

wherein the system pressure in said carbon dioxide separation one is greater than twice the system pressure in said ammonia separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

9. In a process for the separate recovery of ammonia substantially free of carbon dioxide and water, and carbon dioxide substantially free of ammonia and water, from a mixture essentially containing ammonia and carbon dioxide, which mixture is rich with respect to ammonia and additionally contains a substantial amount of water, said process comprising the steps of:

introducing said mixture into a desorption zone and separately removing therefrom a desorption zone off-gas containing ammonia, carbon dioxide and water vapor, and a liquid phase of desorption water substantially free of ammonia and carbon dioxide;

introducing at least a portion of said desorption zone off-gas into an ammonia separation zone and separately removing therefrom an ammonia off-gas substantially free of carbon dioxide and water, and a residual liquid phase containing ammonia, carbon dioxide and water;

introducing said residual liquid phase from said ammonia separation zone into a carbon dioxide separation zone and separately removing therefrom a carbon dioxide off-gas substantially free of ammonia and water and a residual liquid phase containing ammonia, carbon dioxide and water; and introducing said residual liquid phase from said carbon dioxide separation zone into said desorption zone;

wherein the system pressure in said carbon dioxide separation zone is greater than twice the system pressure in said ammonia separation zone, the improvement comprising introducing into the portion of said carbon dioxide separation zone from which said residual liquid phase is removed, an ammonia containing gaseous phase in an amount sufficient to make said residual liquid phase removed therefrom lean with respect to carbon dioxide.

10. The process of claim 7, 8 or 9 wherein the ratio between the respective system pressures in said ammonia separation zone and in said carbon dioxide separation zone is between about 1:5 and 1:20.

11. The process of claim 7, 8 or 9 wherein diluting water is introduced into said carbon dioxide separation zone.

12. The process of claim 1, 2, 3, 4, 7, 8 or 9 wherein said ammonia containing gaseous phase introduced into said carbon dioxide separation zone is comprised of a portion of said desorption zone off-gas.

13. The process of claim 12 wherein from about 1 to 50% by weight of said off-gas removed from said desorption zone is utilized as said ammonia containing gaseous phase.

14. The process of claim 12 wherein from about 5 to 40% by weight of said off-gas removed from said desorption zone is utilized as said ammonia containing gaseous phase.

* * * * *